Aug. 8, 1967     R. O. PROBST     3,334,648
CONTINUOUSLY CIRCULATING VALVED SYSTEM
WITH FLUID CLEANING PROVISIONS
Filed July 15, 1964     2 Sheets-Sheet 1

INVENTOR.
Richard O. Probst,
BY Harry E. Downer
Attorneys.

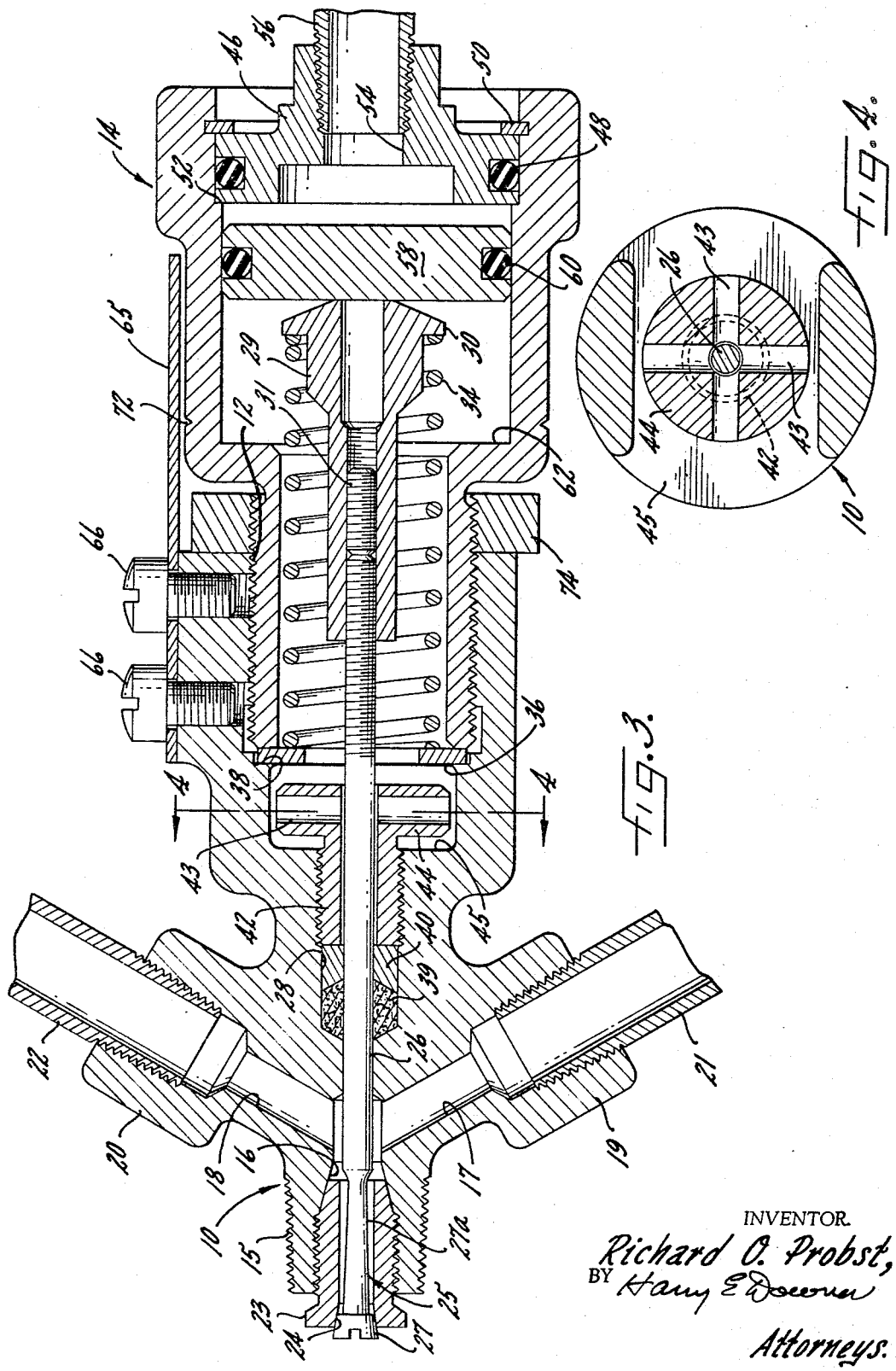

United States Patent Office 3,334,648
Patented Aug. 8, 1967

3,334,648
CONTINUOUSLY CIRCULATING VALVED SYSTEM WITH FLUID CLEANING PROVISIONS
Richard O. Probst, Indianapolis, Ind., assignor to Ransburgh Electro-Coating Corp., Indianapolis, Ind., a corporation of Indiana
Filed July 15, 1964, Ser. No. 382,798
14 Claims. (Cl. 137—238)

This invention relates to a fluid valve, and more particularly to a remotely controllable fluid-actuated metering valve.

It is an object of this invention to provide a valve which is adjustable for controlling the flow therethrough, which can be quickly and easily adjusted for effecting such control, and which can be releasably maintained in the desired position of adjustment. It is a further object of the invention to provide a fluid-actuated valve which can be positively actuated by fluid pressure, which can be easily cleaned without being disconnected from the source of fluid whose flow is to be controlled, which can be employed in association with a continuously circulating system of said fluid whose flow is to be controlled, and which incorporates provisions to permit cleansing of its internal passages and its attached piping while such a circulating system remains in operation.

In accordance with one form of the invention, there is provided a valve casing having first and second sections interconnected in an end-to-end relationship. Said first section is provided with a valve seat operatively associated with a first fluid passage adapted to be disposed in operative communication with the fluid whose flow is to be controlled and in open communication with second and third fluid passages, said valve seat and the junction of said second and third passages constituting the inlet and outlets, respectively, for said first passage. A valve stem is movably carried in the casing sections and has a head receivable against the valve seat to close said valve against fluid movement through said first passage into said second and third passages, said valve stem having means acting in combination with said valve seat to form an adjustable metering orifice. The head is releasably maintained in its valve closed position against the valve seat by biasing means acting on the valve stem.

The valve stem is moved to open the valve by a piston movably carried in the second casing section between the valve stem and a fluid pressure port in said second casing section. In this manner, upon the introduction of a pressurized fluid into said pressure port, the piston will bear against the valve stem to move its head out of engagement with the valve seat for opening the valve to movement of the fluid to be controlled through said first passage and into said second and third passages for discharge from said valve. Conveniently, conduits are connected to said second and third passages for carrying the controlled fluid away from the valve, and one or both of said conduits is provided with additional valve means for selectively controlling fluid movement through either or both of said second and third passages.

The second casing section has an abutment engageable with the piston for limiting its movement against the valve stem for effecting an opening of the valve. The second section is adjustably connected to the first section for adjustably locating said abutment relative to the valve stem and piston. In this manner, movement of the piston against the valve stem is adjustably limited for controlling the movement of the head relative to the valve seat and thereby controlling the flow through the metering orifice and first fluid passage when the valve is in its open position. Conveniently, means are provided on the casing for releasably retaining the first and second casing sections in the desired position of adjustment.

Other objects and features of the invention will become apparent from the more detailed description which follows and from the accompanying drawings, in which:

FIG. 3 is an enlarged axial section of the valve shown in FIG. 1;

FIG. 4 is a transverse section taken on the line 4—4 of FIG. 3; and

Figure 1:
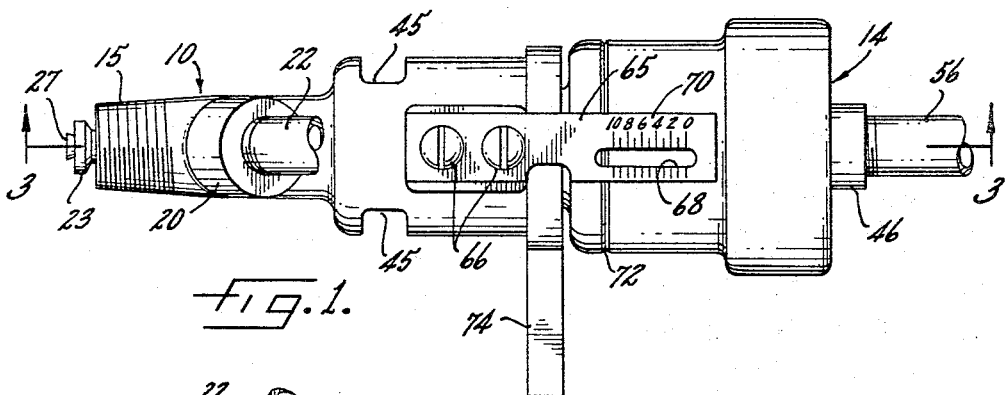
FIG. 1 is a plan view of a valve embodying the invention.
Figure 2:
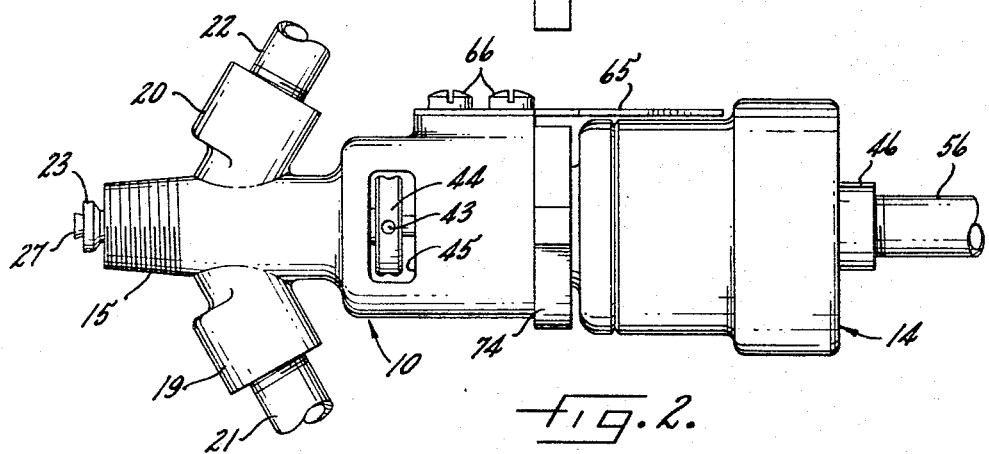
FIG. 2 is a side view of the valve shown in FIG. 1.

As shown, the valve comprises a casing having a first section 10 provided with an open end 12 in which one end of a generally cylindrically shaped second section 14 is received. The end of the section 10 remote from the section 14 is externally threaded, as at 15, for connecting the valve to a conduit carrying the fluid whose flow is to be regulated. A first fluid passage 16 extends inwardly from the end of the section 10 and terminates at its inner end in open communication with a pair of transverse fluid passages 17 and 18. Conveniently, the passages 17 and 18 project outwardly from the passage 16 in a pair of arms 19 and 20 formed on the section 10 transverse to the main axis of the valve and providing a pair of projections to which a pair of conduits 21 and 22 may be connected.

A sleeve valve set 23 having frustoconical inner walls 24 is mounted in the outer end of passage 16. A valve stem 25 extends axially of the casing sections 10 and 14 and comprises an elongated rod 26 having a head 27 at one of its ends provided with frustoconical side walls engageable with the valve seat walls 24 for closing the valve. Immediately inwardly from the head 27 the rod 26 has a frustoconical tapered section 27a which acts in combination with the valve seat 23 to form a metering orifice upon valve opening. The rod 26, which projects axially of the passage 16 and through an opening 28 in the casing section 10, has its opposite end threadably connected to a sleeve 29 provided with an expanded head 30 and carried in the casing section 14. A set screw 31 is threadably received in the sleeve 29 to bear against the adjacent end of the rod 26 for thus releasably retaining said rod in the desired position of axial adjustment with respect to the sleeve 29 and valve seat 23. A coil spring 34 is disposed around the sleeve 29 and the adjacent end of the rod 26 with its ends bearing against the sleeve head 30 and a ring 36 seated against an internal shoulder 38 formed in the casing section 10. In this manner, the spring 34 biases the valve stem 25 to the right as viewed in FIG. 3 to cause the head 27 to seat against the valve seat 23 to releasably retain the valve in a normally closed position even when the sections 10 and 14 are disconnected from each other.

The valve stem 25 is journaled in a packing 39 carried in section opening 28. Said packing is retained in position by a packing screw having a sleeved shank 42 received around the rod 26 and threadably received in the opening 28 to bear upon the packing gland follower 40 to prevent injuring the packing 39 during compression. An expanded head 44 integral with the shank 42 is in disposed alignment with a pair of diametrically opposed openings 45 in the section 10 to permit the packing screw to be drawn up against the packing 39. Conveniently, four holes 43 are formed in the head 44 to facilitate rotation of the packing screw.

The end of the casing section 14 remote from the section 10 is closed by an end cap 46 sealed against the inner wall of said section by an O-ring 48. The end cap 46, which is rotatable with respect to the casing section 14, is retained in position in said casing by a snap ring 50 holding the end cap against a shoulder 52 formed on the inner wall of the casing section. A pressure port 54 is formed in the end cap 46 for connection, as by a conduit 56, to a source of pressurized fluid, such as compressed air or the like. A free floating piston 58 sealed against the inner wall of the section 14 by an O-ring 60 is interposed between the end cap 46 and the sleeve head 30, the latter constituting the adjacent end of the valve stem 25. Thus, upon the introduction of a pressurized fluid into the casing section 14 through the pressure port 54, the piston 58 will move to the left as viewed in FIG. 3 to bear against the sleeve head 30 to cause the valve stem to move its head 27 out of its engagement with the valve seat 23 to open the passage 16 for fluid movement therethrough. In its open position, the valve head 27 extends beyond the valve seat 24 so that in mounting the valve on a conduit carrying the fluid whose flow is to be controlled, the head 27 upon valve opening, will extend substantially outwardly beyond the casing section 10, into the stream of the fluid in said conduit and will be washed clean. Movement of the piston 58 in such a valve opening direction is limited by a shoulder 62 forming an internal abutment in the casing section 14 through which the valve stem can pass but against which the piston 58 seats when the valve is in its fully open position. When the fluid pressure is released from the pressure port 54, the valve stem 25 under the action of the spring 34 will move the head 27 into seating engagement with the valve seat 23 for closing the valve.

It is frequently desirable to control the amount that the valve opens for thus metering the flow of fluid through the passage 16. To this end, the casing sections 10 and 14 are threadably interconnected. As the casing section 14 is moved to the right with respect to the section 10 as viewed in FIG. 3, the valve stem 25 will remain in a fixed axial position with respect to the sections 10 and 12 because of the head 27 seating against the valve seat 23. However, the abutment 62 will be moved to the right with respect to the sleeve 29 thereby decreasing the distance that the piston 58 can move the valve stem in a valve opening direction so that the frustoconical tapered valve stem section 27a will assume a position with respect to the valve seat 24 in which the inlet flow orifice is reduced in area thereby metering or adjusting the flow of fluid through the passage 16 upon valve opening. Since the piston 58 is free floating, rotation of the casing section 14 during adjustment will not be transmitted to the valve stem 25, and there will be no scoring of the valve seat and head upon the rotational adjustment of the casing sections 10 and 14.

In order to calibrate the adjusting movements of the section 14 relative to the section 10 an indicia plate 65 is mounted on the section 10 by a pair of cap screws 66. Said plate projects axially beyond the section 10 to overlie the adjacent wall of the section 14 and has an elongated slot 68 formed therein with reference indicia 70 lining the opposite sides of said slot. The indicia 70 register with an annular groove 72 in the outer wall of the section 14 and thus permit a measurement of the displacement of the section 14 relative to the section 10 for determining how far the valve can move toward its open position. Desirably, a collar 74 is threaded around the section 14 to engage the adjacent end of the section 10 for thus releasably locking the section 14 in the desired position of adjustment relative to the section 10. With the end cap 46 being rotatably carried in the section 14, said section may be rotated into the desired position of adjustment without effecting a rotation of the end cap 46 to thus prevent the conduit 56 from becoming twisted upon adjustment of the valve.

Figure 5:
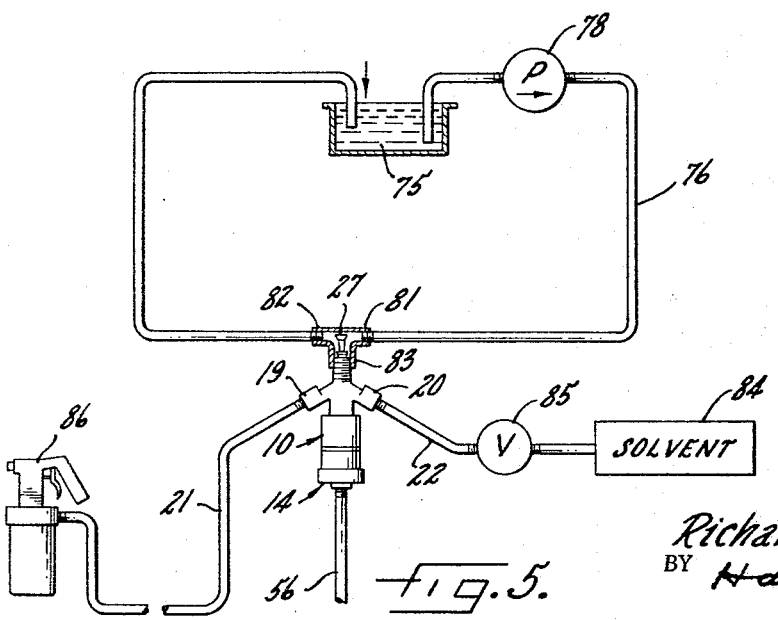
FIG. 5 is a diagrammatic showing of the valve shown in FIG. 1 mounted in a continuously circulating fluid system.

The valve can be used in combination with a circulating fluid system, such as a circulating paint system for metering the flow of paint from the system to a spray gun or the like. In such a system, as illustrated in FIG. 5, the paint is moved from a paint source or reservoir 75 through a conduit 76 by means of a pump 78. A T-pipe joint has its arms 81 and 82 connected to the conduit 76 with its third arm 83 connected to the threaded end 15 of the casing section 10 for operatively interconnecting the passage 16 to the conduit 76 and permitting the valve head 27 to extend into the flow of paint circulating through the system when the valve is opened. The conduit 22 will normally be connected to a solvent source 84 through a valve 85, and the conduit 21 will normally be connected to a spray gun or the like 86. With the valve connected to the conduit 76 in such a manner and the valve 85 closed, air admitted through the conduit 56 into the pressure port 54 will cause the piston 58 to move against the valve stem 25 to move the head 27 out of engagement with the valve seat 23 for opening the valve. Upon such opening, the paint will be metered through the passage 16 into the passage 17 for discharge to the spray gun 86 through the conduit 21. When the pressure is removed from the pressure port 54, the valve will close under the action of the spring 34 to thus prevent paint movement from the conduit 76 into the passage 16, and said paint will thus continue to circulate through the conduit 76 under the action of the pump 78. The amount of paint moving through the passages 16 and 17 upon valve opening is controllable by the adjustment of the casing 14 relative to the casing 10 for thus metering the flow of paint from the conduit 76 to the spray gun or the like.

As shown, the valve can be connected into a conventional circulating system by a conventional T-pipe joint, but should it be desired to remove the valve completely from the system a plug may be inserted in the joint arm 83, and the fluid can be circulated and recirculated through the conduit 76 in a conventional manner.

If it is desired to clean the valve, it is merely necessary to close the passage 16 by having the head 27 seat against the valve seat 23 and open the valve 85 in the conduit 22 to permit a solvent to flow through the passages 18 and 17 and the adjacent end of the passage 16. If it is desired to clean the casing section 14 and the components carried therein, said section can be removed from the section 10 by merely unscrewing the locking collar 74 and removing the section 14 from the section 10 without disturbing the interconnection of the casing 10 to the conduit 76 and without interrupting the flow in the circulating system.

As will be apparent, the instant invention can be manufactured in a compact form so that it can be mounted in a location relatively close to the spray gun 86 thereby obviating any need for the conduit 21 having a substantial length which would increase pigment separation when the paint was not flowing to the spray gun. Thus, this invention is highly useful in finishing operations wherein several different colored coating materials are applied to a product with separate circulating systems, metering valves, and spray guns being required for each color, since it permits a large number of the valves to be located closely adjacent their respective spray guns.

I claim:
1. A pressure operated valve, comprising a casing having interconnected first and second sections, said first section having a fluid passage having an inlet and outlet, said first section being adapted to be connected to a first fluid carrying conduit at said inlet, a valve seat at said inlet, a valve stem movably carried in said casing sections and having a head receivable against said valve seat to close the valve to movement of fluid through said fluid passage and movable in the direction of said first fluid carrying conduit to open said valve to movement of fluid through said fluid passage, biasing means urging said head into a valve closed position, a fluid pressure port in said second section, and a piston in said second section interposed between said pressure port and valve stem and movable toward said valve stem upon the introduction of a pressurized second fluid from a second fluid carrying conduit into said port to bear against said valve stem to move said head into a valve open position, said second section having an abutment engageable with said piston for limiting its movement against said valve stem, said second section being adjustably connected to said first section for adjustably locating said abutment relative to said valve stem and piston for adjustably limiting the movement of the piston against said valve stem.

2. The invention as set forth in claim 1 with the addition that means are provided on said casing for releasably retaining said first and second sections in the desired position of adjustment.

3. The invention as set forth in claim 1 in which said valve seat and head have engaging frustoconical walls, and said valve stem has a tapered portion immediately adjacent said head.

4. The invention as set forth in claim 1 in which said valve seat is removably mounted at the end of said first casing section remote from said second casing section.

5. The invention as set forth in claim 1 with the addition that indicia are provided on said first and second sections for measuring the axial positioning of the second section relative to the first section.

6. The invention as set forth in claim 1 with the addition that said valve stem projects through a packing and packing screw carried in said first section, said packing screw having an expanded head connected to a threaded shank carried around said valve stem and threadably connected to said first section to urge said packing against an abutment in said first section, said first section having at least one opening therein in alignment with the head on said packing screw for tightening said screw in said section.

7. The invention as set forth in claim 1 in which said valve stem comprises a rod having said head mounted on one of its ends and a sleeve mounted on its opposite end, and said biasing means comprises a coil spring disposed around said valve stem with its ends bearing against said sleeve and abutment means on said first section.

8. The invention as set forth in claim 7 in which said rod is threadably received in said sleeve, and a set screw is threadably received in said sleeve to engage said rod for releasably retaining it in the desired axial position with respect to said sleeve.

9. In combination with a circulating fluid system comprising a fluid source, a first conduit for conveying a first fluid from said fluid source, and means for moving said first fluid through said first conduit; a valve comprising a casing having a first section rigidly interconnected at one of its ends to said first conduit and adjustably connected at its opposite end to a second section, said first section having a first fluid passage in open communication with said first conduit and with second and third fluid passages respectively connected to second and third conduits, a valve seat in said first passage between said first conduit and the second and third passages, a valve stem carried in said casing sections and movable therein, a head on said valve stem receivable against said valve seat, biasing means urging said head against the valve seat, a fluid pressure port in said second section connected to a source of a pressurized second fluid, a piston interposed between said pressure port and valve stem in said second section and movable upon said pressurized second fluid entering said pressure port to bear against said valve stem to move said head out of engagement with the valve seat to permit flow of said first fluid from said first conduit into said first, second, and third fluid passages, valve means in said second and third conduits for controlling the flow therethrough from said first conduit and for permitting flow through only said second and third conduits upon said head engaging said valve seat, said second section having an abutment engageable with said piston for limiting its movement against said valve stem and movable with said second section relative to said valve stem for adjustably limiting the movement of said piston against the valve stem.

10. The invention as set forth in claim 9 in which a pair of arms of a T-shaped pipe joint are connected to said first conduit and said valve is connected to the other arm of said joint, and said valve head projects into the juncture of said joint arms upon opening of the valve.

11. In combination with a circulating fluid system comprising a fluid source, a first conduit for conveying a first fluid from said fluid source, and means for moving said first fluid through said first conduit; a valve comprising a casing having a first section rigidly interconnected at one of its ends to said first conduit and adjustably connected at its opposite end to a second section, said first section having a first fluid passage in open communication with said first conduit and with a second passage connected to a second conduit, a valve seat in said first passage between said first conduit and said second passage, a valve stem carried in said casing sections and movable therein, a head on said valve stem receivable against said valve seat, biasing means urging said head against the valve seat, a fluid pressure port in said second section connected to a source of a pressurized second fluid, a piston interposed between said pressure port and valve stem in said second section and movable upon said pressurized second fluid entering said pressure port to bear against said valve stem to move said head out of engagement with the valve seat to permit flow of said first fluid from said first conduit into said first and second fluid passages, said second section having an abutment engageable with said piston for limiting its movement against said valve stem and movable with said second section relative to said valve stem for adjustably limiting the movement of said piston against the valve stem.

12. A pressure operated valve, comprising a casing having first and second sections, the first section having a fluid passage with an inlet and an outlet and being adapted to be connected to a first fluid carrying conduit at said inlet, a valve seat at the inlet, the second section defining a cylinder adjustably interconnected to the first section and having a fluid pressure port, valve actuating means in said first and second sections including a piston in the second section and a valve stem carried in said first and second sections and having a valve head receivable against the valve seat at the inlet, biasing means urging said head into a valve closed position, said piston in the second section being interposed between said pressure port and valve stem and movable toward said valve stem upon introduction of a pressurized second fluid from a second fluid carrying conduit into said port to bear against said valve stem and to move the valve head toward the first fluid carrying conduit into a valve open position, and means in said second section engageable with said valve actuating means for limiting its movement of said valve head, said second section being adjustable with respect to said first section for adjustably locating said means relative to said valve actuating means for adjustably limiting the movement of said head with respect to said valve seat.

13. The invention as set forth in claim 12 wherein said valve stem includes a portion adjacent the valve head defining with said valve seat an annular passage of varying cross-sectional area, and said first section and second sections are threadably interconnected whereby said second section is axially adjustable with respect to said first section and said valve actuating means to control the average cross-sectional area of the annular passage in the valve open position.

14. The invention as set forth in claim 13 wherein said piston is freely movable with respect to said valve stem and said second section, said biasing means is engageable with a sleeve on said valve stem and the first section, and said pressure port is in a cap rotatably carried in said second section.

References Cited
UNITED STATES PATENTS

| | | | |
|---|---|---|---|
| 551,370 | 12/1895 | Donnelly | 251—62 X |
| 851,914 | 4/1907 | Bottger | 251—62 X |
| 2,010,129 | 8/1935 | Baker | 251—62 X |
| 2,257,004 | 9/1941 | Fleming | 137—240 X |
| 2,619,119 | 11/1952 | Warcup | 137—240 X |
| 2,766,911 | 10/1956 | Greaves | 137—238 X |
| 3,025,871 | 3/1962 | Roth | 137—238 |
| 3,114,387 | 12/1963 | Barkan | 251—62 X |
| 3,133,554 | 5/1964 | Joebken | 137—240 |

CLARENCE R. GORDON, *Primary Examiner.*